US007912572B2

(12) United States Patent
Du et al.

(10) Patent No.: US 7,912,572 B2
(45) Date of Patent: Mar. 22, 2011

(54) CALIBRATION ASSEMBLY FOR AN INSPECTION SYSTEM

(75) Inventors: Xiaoming Du, Shanghai (CN); Kevin George Harding, Niskayuna, NY (US); Steven Robert Hayashi, Niskayuna, NY (US); Jianming Zheng, Shanghai (CN); Tian Chen, Shanghai (CN); Howard Paul Weaver, Mason, OH (US); Yong Yang, Atlanta, GA (US); Guofei Hu, Shanghai (CN); James Allen Baird, Jr., Amelia, OH (US)

(73) Assignee: General Electric Company, Niskayuna, NY (US)

( * ) Notice: Subject to any disclaimer, the term of this patent is extended or adjusted under 35 U.S.C. 154(b) by 479 days.

(21) Appl. No.: 11/858,483

(22) Filed: Sep. 20, 2007

(65) Prior Publication Data

US 2009/0082899 A1  Mar. 26, 2009

(51) Int. Cl.
  *G01D 18/00* (2006.01)
  *G01N 3/62* (2006.01)
  *G05B 19/18* (2006.01)
  *G05B 15/00* (2006.01)
  *G06F 19/00* (2006.01)

(52) U.S. Cl. ............ 700/174; 700/254; 73/1.01; 702/85

(58) Field of Classification Search .......... 700/174–178, 700/254; 33/502–504; 73/1.01, 1.75, 1.79–1.82, 73/865.8; 702/85, 104, 182–186
See application file for complete search history.

(56) References Cited

U.S. PATENT DOCUMENTS

| | | | | | |
|---|---|---|---|---|---|
| 3,892,042 | A | * | 7/1975 | Senften | 33/301 |
| 4,138,825 | A | * | 2/1979 | Pelta | 33/228 |
| 4,355,900 | A | * | 10/1982 | Nussmeier | 356/498 |
| 4,444,061 | A | * | 4/1984 | Mathias | 73/862.06 |
| 4,702,101 | A | * | 10/1987 | Abbe et al. | 73/1.38 |
| 4,974,165 | A | * | 11/1990 | Locke et al. | 700/193 |
| 4,991,304 | A | * | 2/1991 | McMurtry | 33/505 |
| 5,140,534 | A | * | 8/1992 | Miller et al. | 700/279 |
| 5,257,460 | A | * | 11/1993 | McMurtry | 33/502 |
| 5,359,885 | A | * | 11/1994 | Ohms | 73/146 |
| 5,430,948 | A | * | 7/1995 | Vander Wal, III | 33/502 |
| 5,923,435 | A | * | 7/1999 | Bornhorst et al. | 358/3.32 |
| 6,161,055 | A | * | 12/2000 | Pryor | 700/175 |
| 6,233,533 | B1 | * | 5/2001 | Xu et al. | 702/91 |
| 6,568,096 | B1 | * | 5/2003 | Svitkin et al. | 33/550 |
| 6,580,964 | B2 | * | 6/2003 | Sutherland et al. | 700/193 |
| 6,752,031 | B2 | * | 6/2004 | Akamatsu et al. | 73/865.9 |

(Continued)

OTHER PUBLICATIONS

Tsuneo Kagawa, Hiroaki Nishino, Kouichi Utsumiya; "A Sensitive Coloring and Texture Mapping on 3D Shapes"; 2004 IEEE International Conference on Systems, Man and Cybernetics; pp. 5748-5753.

(Continued)

*Primary Examiner* — M.N. Von Buhr
(74) *Attorney, Agent, or Firm* — Penny A. Clarke

(57) ABSTRACT

A method of calibrating an inspection system is provided. The method includes contacting a test part with a run-out measurement device and rotating the test part and measuring a first run-out using the run-out measurement device. The method also includes moving the run-out measurement device to a new position and repeating the steps of contacting and rotating the test part to measure a second run-out at the new position. The method further includes using the first and second run-outs to adjust measurements of the inspection system.

25 Claims, 8 Drawing Sheets

U.S. PATENT DOCUMENTS

| | | | | |
|---|---|---|---|---|
| 6,839,975 | B2 * | 1/2005 | Fujishima | 33/502 |
| 6,884,204 | B2 * | 4/2005 | Watanabe | 483/12 |
| 6,964,102 | B2 * | 11/2005 | Schroder | 33/1 PT |
| 7,026,637 | B2 * | 4/2006 | Sarr | 250/559.23 |
| 7,055,367 | B2 * | 6/2006 | Hajdukiewicz et al. | 73/1.79 |
| 7,079,969 | B2 * | 7/2006 | Taylor et al. | 702/95 |
| 7,131,207 | B2 * | 11/2006 | McFarland | 33/503 |
| 7,173,691 | B2 * | 2/2007 | Murphy et al. | 356/138 |
| 7,191,535 | B2 * | 3/2007 | Banks et al. | 33/502 |
| 7,210,321 | B2 * | 5/2007 | George | 72/31.03 |
| 7,246,448 | B2 * | 7/2007 | Lotze | 33/559 |
| 7,254,506 | B2 * | 8/2007 | McMurtry et al. | 702/95 |
| 7,268,886 | B2 * | 9/2007 | Kim et al. | 356/492 |
| 7,286,949 | B2 * | 10/2007 | McFarland et al. | 702/95 |
| 7,328,125 | B2 * | 2/2008 | Kawai et al. | 702/155 |
| 7,408,650 | B2 * | 8/2008 | Ueshima et al. | 356/498 |
| 7,523,561 | B2 * | 4/2009 | McFarland | 33/554 |
| 7,533,574 | B2 * | 5/2009 | McMurtry et al. | 73/763 |
| 7,568,373 | B2 * | 8/2009 | McMurtry et al. | 73/1.81 |
| 2003/0210060 | A1 * | 11/2003 | Schmid | 324/661 |
| 2004/0015326 | A1 * | 1/2004 | Bluestein | 702/155 |
| 2004/0195922 | A1 * | 10/2004 | Hsu et al. | 310/67 R |
| 2005/0253054 | A1 * | 11/2005 | Guarino | 250/231.14 |
| 2007/0010959 | A1 * | 1/2007 | Chang et al. | 702/94 |
| 2007/0124015 | A1 | 5/2007 | Chen et al. | |
| 2007/0145932 | A1 * | 6/2007 | Kawai et al. | 318/575 |
| 2007/0244659 | A1 * | 10/2007 | Suh et al. | 702/104 |
| 2008/0189934 | A1 * | 8/2008 | Henshaw | 29/602.1 |

OTHER PUBLICATIONS

Charlie C. L. Wang, Terry K. K. Chang, Matthew M .F. Yuen; "From laser-scanned data to feature human model: a system based on fuzzy logic concept"; Computer-Aided Design 35(3): 241-253 (2003).

* cited by examiner

CALIBRATION ASSEMBLY FOR AN INSPECTION SYSTEM

BACKGROUND

The invention relates generally to calibration assembly for inspection systems, and particularly to calibration assembly for cutting tool inspection systems.

Various types of cutting tools are known and are in use for machining parts. Typically, each cutting tool has associated parameters to define the shape and profile of the cutting tool. Further, the performance of the machined parts depends upon such parameters. For example, a ball end mill has associated parameters such as axial primary relief angle, flute spacing, ball end radius and so forth. It is required to inspect the cutting tools from time-to-time for ensuring a desired performance of such tools. In general, the parameters associated with such tools are estimated and compared to desired values for determining the cutting performance of such tools. Particularly, it is desirable to determine such parameters for complex cutters having features defined by these parameters.

Typically, the physical part is sliced and an optical comparator or a hard gage is employed to measure the parameters at any section of the sliced part. However, this technique requires physical slicing of the tools thereby making them unusable for future machining. Certain other systems employ image processing techniques for estimating the tool parameters from captured projections. For example, a two-dimensional profile of the cutting tool may be captured using a camera and a run-out of the part may be estimated based upon the two-dimensional profile. However, such measurement techniques do not account for alignment errors due to orientation of the axes of the cutting tool and have relatively less accuracy.

Accordingly, it would be desirable to develop an improved technique for determining tool parameters for cutting tools. Particularly, it will be advantageous to develop a technique for accurate estimation of the tool parameters without damaging the tool.

BRIEF DESCRIPTION

Briefly, according to one embodiment, a method of calibrating an inspection system is provided. The method includes contacting a test part with a run-out measurement device and rotating the test part and measuring a first run-out using the run-out measurement device. The method also includes moving the run-out measurement device to a new position and repeating the steps of contacting and rotating the test part to measure a second run-out at the new position. The method further includes using the first and second run-outs to adjust measurements of the inspection system.

In another embodiment, a method of calibrating an inspection system is provided. The method includes rotating a test part to contact a displacement measurement device, simultaneously rotating the test part and moving the displacement measurement device to a new position and measuring a first displacement at the new position using the displacement measurement device. The method also includes rotating the test part at a pre-determined rotation angle, and repeating the steps of rotating the test part to contact the displacement measurement device and simultaneously rotating the test part and moving the displacement measurement device to measure a second displacement. The method further includes using the first and second displacements to adjust measurements of the inspection system.

In another embodiment, a calibration assembly for an inspection system is provided. The calibration assembly includes a servo motor configured to rotate a test part about a rotary axis at pre-determined rotating steps and a run-out measurement device configured to measure first and second run-outs corresponding to the test part at first and second positions of the run-out measurement device. The calibration assembly also includes a processor configured to estimate calibration parameters from the first and second run-outs measured by the run-out measurement device.

In another embodiment, a calibration assembly for an inspection system is provided. The calibration assembly includes a servo motor configured to rotate a test part about a rotary axis at pre-determined rotating steps, a slider configured to move the test part along a z-axis and a displacement measurement device configured to measure first and second displacements corresponding to the test part at first and second positions of the displacement measurement device. The calibration assembly also includes a processor configured to estimate calibration parameters from the first and second displacements measured using the displacement measurement device.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present technique function to provide a technique for extraction of parameters of cutting tools employed in various applications such as ball end mills, flat end mills, drills and reamers. In particular, the present technique employs a calibration technique to account for alignment errors due to orientation of axes of the cutting tool and a test part for providing an accurate estimation of the parameters.

Figure 1:
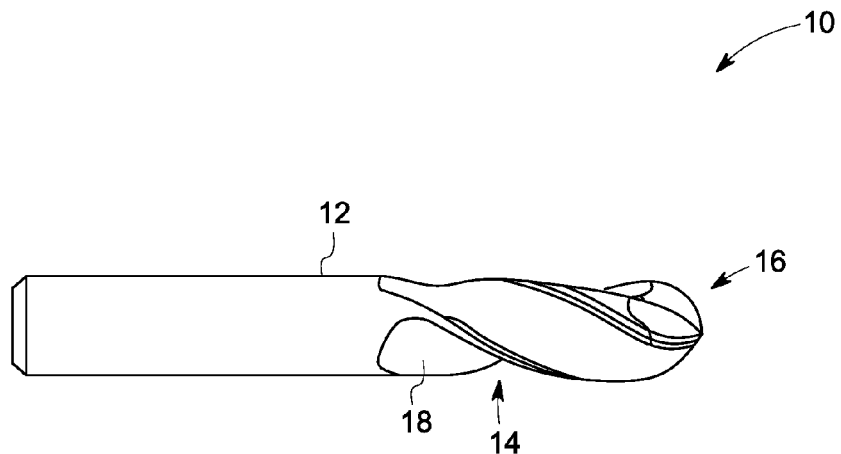
FIG. 1 is a diagrammatical illustration of a cutting tool in accordance with aspects of the present technique.

Turning now to drawings and referring first to FIG. 1, a cutting tool 10 is illustrated of the type that can be utilized in a machine or fixture, and inspected by an inspection system, the geometric characteristics of which can be determined by the present techniques. In the illustrated embodiment, the cutting tool 10 comprises a ball end mill. The ball end mill 10 is employed as a cutting tool in a vertical mill such as a mini-mill. As illustrated, the ball end mill 10 includes a shank 12 and a cylindrical cutting area 14. Further, the ball end mill 10 has a rounded tip 16 for milling grooves with a semi-circular cross-section.

The cutting area 14 includes a plurality of flutes 18 based upon a desired profile of the machined part and a plurality of cutting edges. For example, a 2-flute mill may be employed for cutting slots or grooves. Similarly, a 4-flute mill may be employed for a surface milling operation. The ball end mill 10 has a plurality of parameters corresponding to the cylindrical cutting area 14 and the rounded tip 16 that are representative of cutting performance of the mill 10. Examples of such parameters include, but are not limited to, axial primary relief angle, flute spacing, radial primary relief angle, radial rake angle, ball end radius, concentricity, core diameter, axial gash angle, axial rake angle, axial secondary clearance angle, helix angle, radial secondary clearance angle and shank diameter. The parameter extraction of such parameters to assess the cutting performance of the cutting tool such as the ball end mill 10 is performed using an inspection system. The present invention employs a calibration technique for calibration of such inspection systems, which will be described in detail below.

Figure 2:
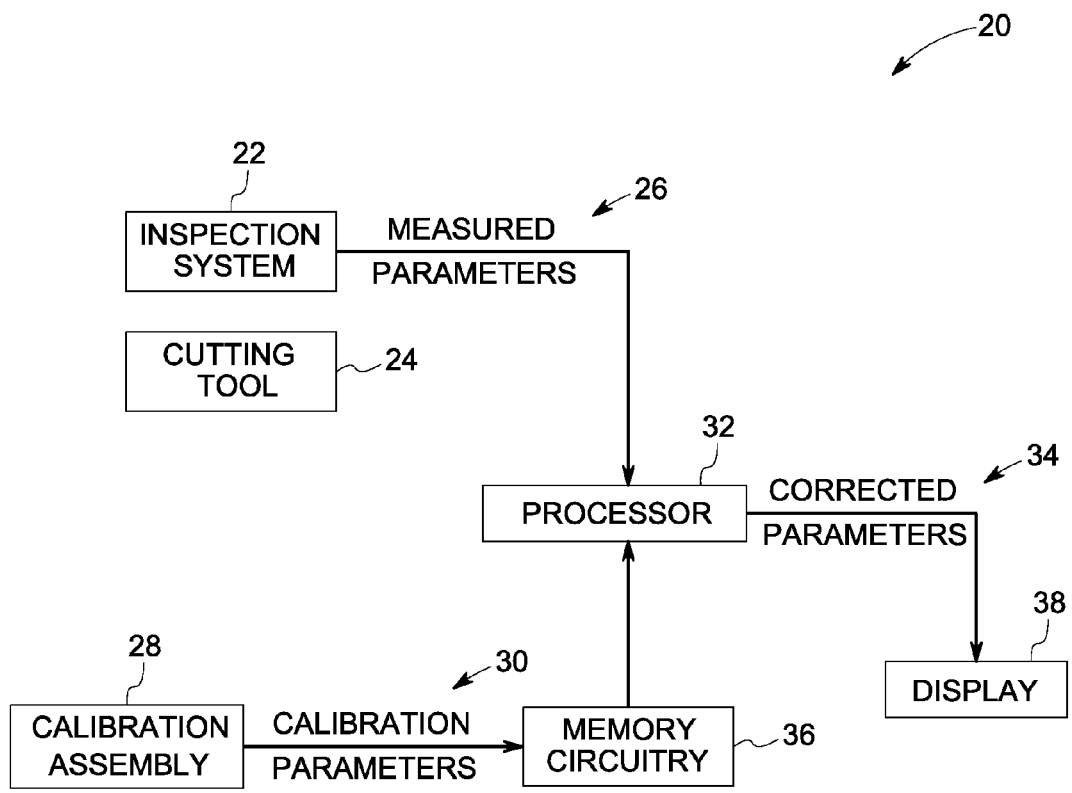
FIG. 2 is a diagrammatical illustration of an exemplary configuration of a system for calibrating an inspection system in accordance with aspects of the present technique.

FIG. 2 is a diagrammatical illustration of an exemplary configuration 20 of a system for calibrating an inspection system 22. In this exemplary embodiment, the inspection system 22 includes a cutting tool inspection system configured to measure parameters 26 of a cutting tool 24. Examples of the cutting tool 24 include, but are not limited to, ball end mills, flat end mills, drills and reamers. Further, examples of the cutting tool parameters 26 include, but are not limited to, axial primary relief angle, flute spacing, radial primary relief angle, radial rake angle, ball end radius, concentricity, core diameter, axial gash angle, axial rake angle, axial secondary clearance angle, helix angle, radial secondary clearance angle and shank diameter.

Moreover, the system 20 includes a calibration assembly 28 for calibrating the inspection system 22. In particular, the calibration assembly 28 estimates calibration parameters 30 for correcting any alignment error due to orientation of the axes of the cutting tool 24. The system also includes a processor 32 for receiving the measured and calibration parameters 26 and 30 for estimating corrected parameters 34 corresponding to the cutting tool 24. It should be noted that the present invention is not limited to any particular processor for performing the processing tasks of the invention. The term "processor," as that term is used herein, is intended to denote any machine capable of performing the calculations, or computations, necessary to perform the tasks of the invention. The term "processor" is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of the invention, as will be understood by those skilled in the art In certain embodiments, the calibration parameters 30 may be stored in a memory circuitry 36 and may be utilized to estimate the corrected parameters 34 for future measurements from the cutting tool 24. The memory circuitry 36 may include hard disk drives, optical drives, tape drives, random access memory (RAM), read-only memory (ROM), programmable read-only memory (PROM), redundant arrays of independent disks (RAID), flash memory, magneto-optical memory, holographic memory, bubble memory, magnetic drum, memory stick, tape, smartdisk, thin film memory, zip drive, and so forth. Further, the corrected parameters 34 may be made available to a user of the system 30 via a display 38. The details of the calibration assembly 28 and the calibration process will be described in detail below with reference to FIGS. 3-10.

Figure 3:
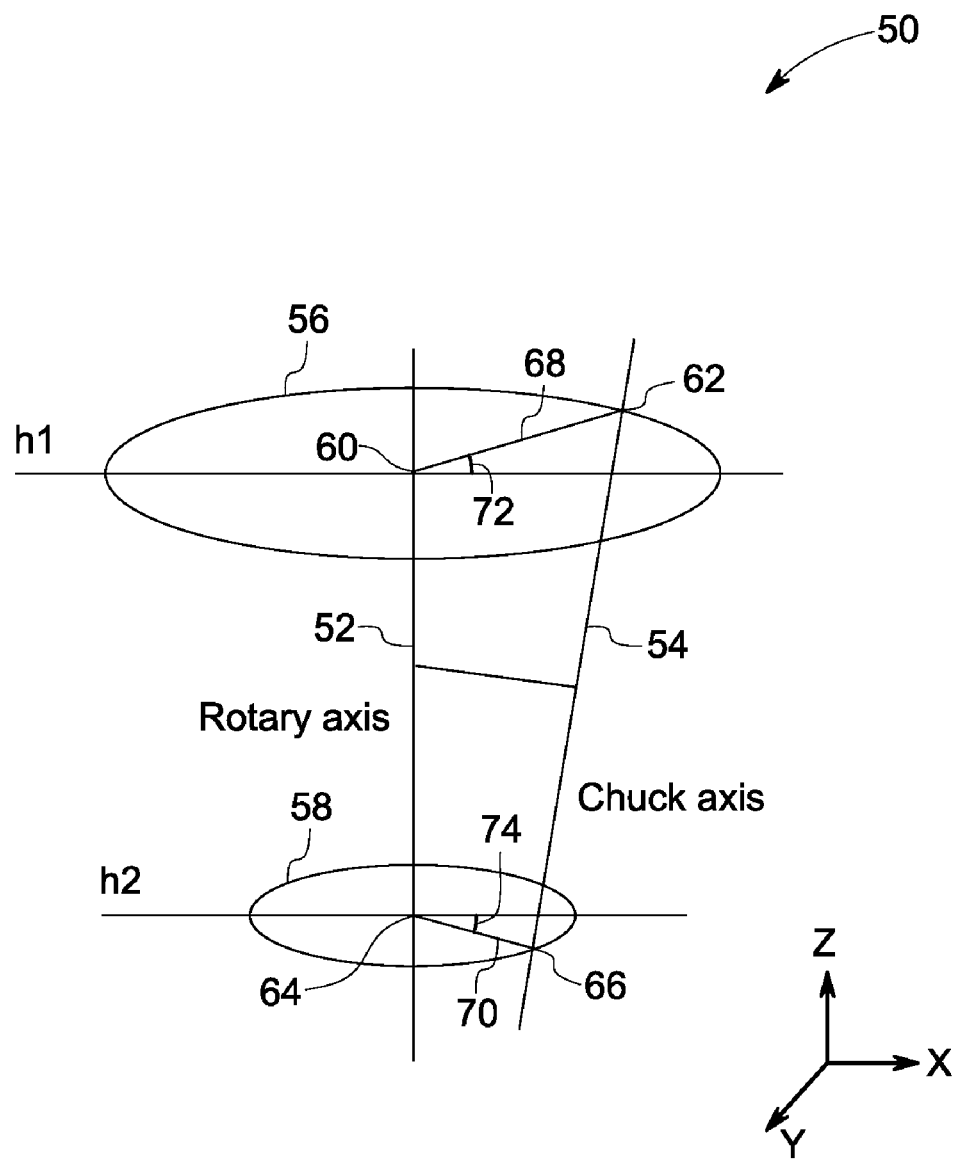
FIG. 3 is a diagrammatical illustration of an exemplary error model employed for correcting alignment error between rotary and chuck axes of the cutting tool of FIG. 1.

FIG. 3 is a diagrammatical illustration of an exemplary error model 50 employed for correcting alignment error between rotary and chuck axes 52 and 54 of the cutting tool 24 of FIG. 2. In this exemplary embodiment, at least two section planes such as represented by reference numerals 56 and 58 are selected. The two section planes 56 and 58 are located at heights $h_1$ and $h_2$ respectively. The section plane 56 intersects the rotary and chuck axes 52 and 54 at two intersections points represented by reference numerals 60 and 62. Similarly, the section plane 58 intersects the rotary and chuck axes 52 and 54 at two intersections points represented by reference numerals 64 and 66.

The distance $(r_1)$ between the intersection points 60 and 62 is represented by reference numeral 68 and the distance $(r_2)$ between the intersection points 64 and 66 is represented by reference numeral 70. Further, an angle $(\alpha_1)$ between an X-axis and a line joining the intersection points 60 and 62 is represented by reference numeral 72. Similarly, an angle $(\alpha_2)$ between the X-axis and a line joining the intersection points 64 and 66 is represented by reference numeral 74. In this exemplary embodiment, the parameters $h_1$, $h_2$, r1, r2, $\alpha_1$, and $\alpha_2$ are utilized to calibrate the inspection system 22 of FIG. 2. The details of the calibration of the inspection system 22 using the error model 50 will be described in a greater detail below.

Figure 4:
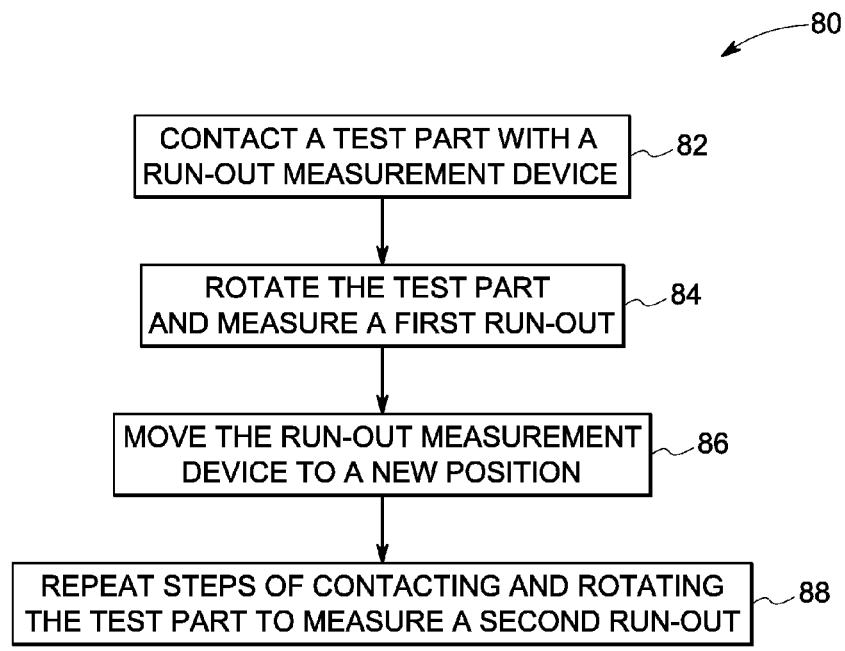
FIG. 4 is a flow chart illustrating an exemplary process for calibrating the inspection system of FIG. 2 in accordance with aspects of the present technique.

FIG. 4 is a flow chart illustrating an exemplary process 80 for calibrating the inspection system 22 of FIG. 2. At step 82, a test part is contacted with a run-out measurement device. Further, the test part is rotated and a first run-out corresponding to the test part is measured using the run-out measurement device (step 84). In certain embodiments, the test part is rotated at pre-determined rotating steps and the run-out for the test part is measured at each of these pre-determined rotating steps. In one embodiment, the pre-determined rotating step comprises a rotation angle of less than about 1 degree. In another embodiment, the pre-determined rotating step comprises a rotation angle of about 0.5 degrees. At step 86, the run-out measurement device is moved to a new position along a z-direction. Further, at step 88, the steps of contacting and rotating the test part (steps 82, 84) are repeated to measure a second run-out corresponding to the test part. In this exemplary embodiment, the first and second run-outs measured by the run-out measurement device are utilized to estimate the calibration parameters such as described above for the inspection system 22. Advantageously, the calibration parameters reduce an alignment error of the rotary and chuck axes of the cutting tool. Further, the calibration parameters are employed to correct the measurements made by the inspection system 22.

Figure 5:
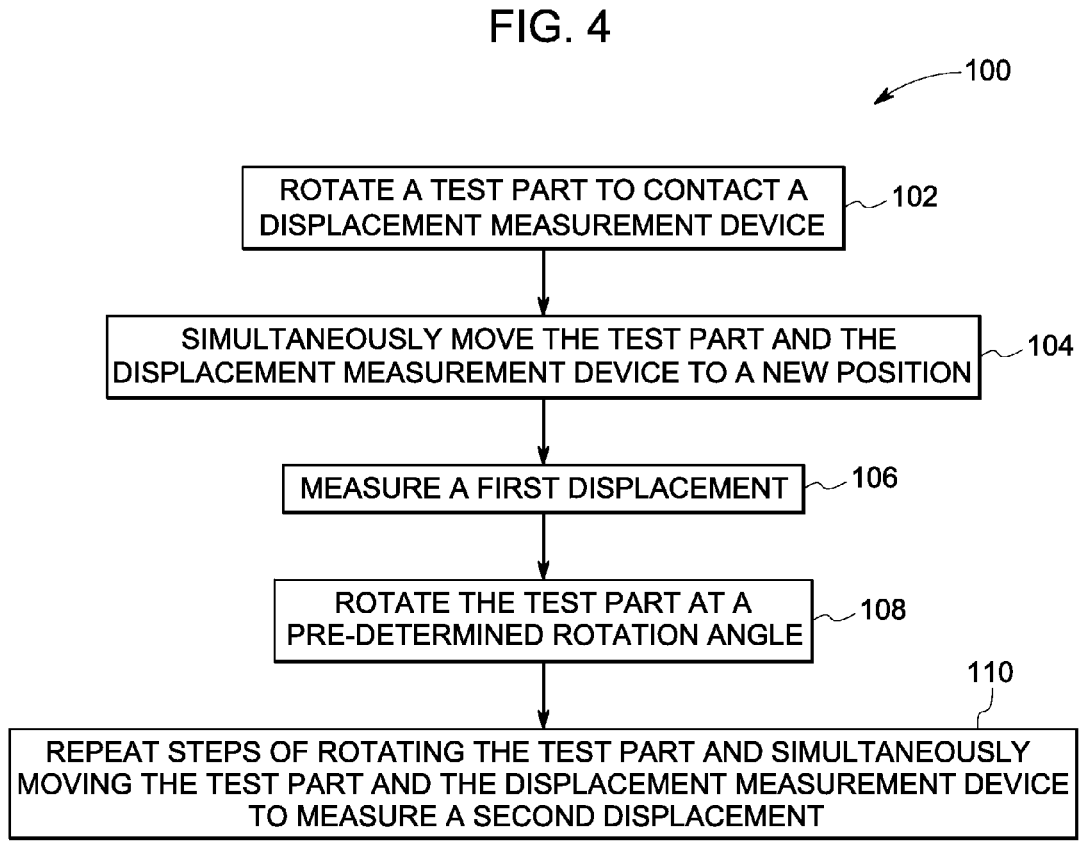
FIG. 5 is a flow chart illustrating another exemplary process for calibrating the inspection system of FIG. 2 in accordance with aspects of the present technique.

FIG. 5 is a flow chart illustrating another exemplary process 100 for calibrating the inspection system 22 of FIG. 2 in accordance with aspects of the present technique. At step 102, the test part is rotated to contact a displacement measurement device. Further, at step 104, the test part and the displacement measurement device are moved to a new position. In this exemplary embodiment, the test part and the displacement measurement device are moved such that the test part contacts the displacement measurement device at a plurality of locations. In one exemplary embodiment, the test part contacts the displacement measurement device at four locations. Further, heights and rotary angles at two edge points may represent the calibration parameters $h_1$, $h_2$, $\alpha_1$, and $\alpha_2$. The displacement measurement device is then used to measure a first displacement at this new position, as represented by step 106. The displacement measurements at different rotation angles may be plotted and a curve is fitted through such data points. Further, a slope (slope 1) of this curve is estimated.

At step 108, the test part is rotated at a pre-determined rotation angle. In this exemplary embodiment, the test part is rotated at about 180 degrees. Further, the steps of rotating the test part and the simultaneously moving the displacement measurement device (steps 102 and 104) are repeated to measure a second displacement (step 110). Again, as described above, the displacement measurements at different rotation angles may be plotted and a curve is fitted through such data points. Further, a slope (slope 2) of this curve is estimated. Moreover, an angle between a z-stage and the rotary axis in a XOZ plane is determined by estimating an average of slope 1 and slope 2. As will be appreciated by one skilled in the art, the technique described above may be similarly employed to estimate an angle between the z-stage and the rotary axis in a YOZ plane. Advantageously, estimation of parameters such as the angles between the z-stage and the rotary axis in the XOZ and YOZ planes substantially reduces any alignment error due to orientation of rotary axis of the test part and the z-axis.

Figure 6:
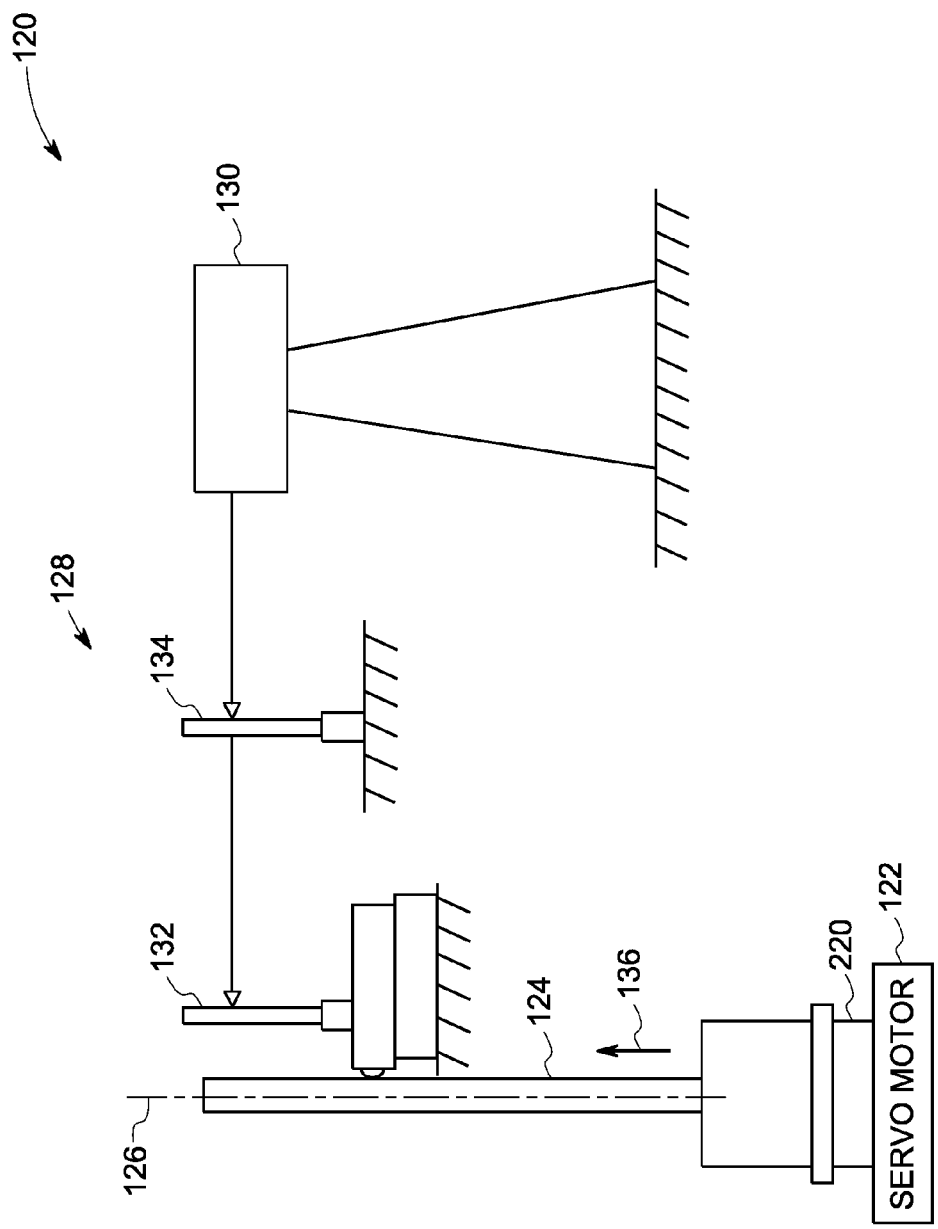
FIG. 6 is a diagrammatical illustration of an exemplary configuration of the calibration assembly employed in the system of FIG. 2 in accordance with aspects of the present technique.

FIG. 6 is a diagrammatical illustration of an exemplary configuration 120 of the calibration assembly 28 employed in the system 22 of FIG. 2 in accordance with aspects of the present technique. In this exemplary embodiment, the calibration assembly 120 is configured to calibrate a cutting tool inspection system. Further, the cutting tool may include a ball end mill, or a flat end mill, or a drill, or a reamer. The calibration assembly 120 includes a servo motor 122 configured to rotate a test part 124 about a rotary axis 126 at pre-determined rotating steps.

Further, the calibration assembly 120 includes a run-out measurement device 128 configured to measure first and second run-outs corresponding to the test part 124 at first and second positions of the run-out measurement device 128. In one exemplary embodiment, the run-out measurement device 128 includes a laser interferometer. In this embodiment, the laser interferometer 128 includes a laser 130, a reflective mirror 132 and an interferometry mirror 134. Moreover, the first and second run-outs are utilized by the processor 32 (see FIG. 2) for estimating the calibration parameters 30 (see FIG. 2) from the first and second run-outs measured by the run-out measurement device 128.

In certain embodiments, the calibration assembly 120 includes an optical encoder 220 coupled to the servo motor 122 for rotating the test part 124 at the pre-determined rotating steps. In one exemplary embodiment, each of the pre-determined rotating steps comprises a rotation angle of about less than 1 degree. In another exemplary embodiment, each of the pre-determined rotating steps comprises a rotation angle of about 0.5 degrees. In operation, the test part 124 is rotated at the pre-determined rotating steps. Further, the run-out measurements are obtained for each of the rotating steps using the laser interferometer 128. In this exemplary embodiment, the run-out measurement device 128 is moved along a z-direction as represented by reference numeral 136. The test part 124 is subsequently rotated at the pre-determined rotating steps as described above and the run-out measurements are obtained for each of the rotating steps at the new location of the run-out measurement device 128. Such run-out measurements are utilized to obtain the calibration parameters for the inspection system 22 (see FIG. 2).

Figure 7:
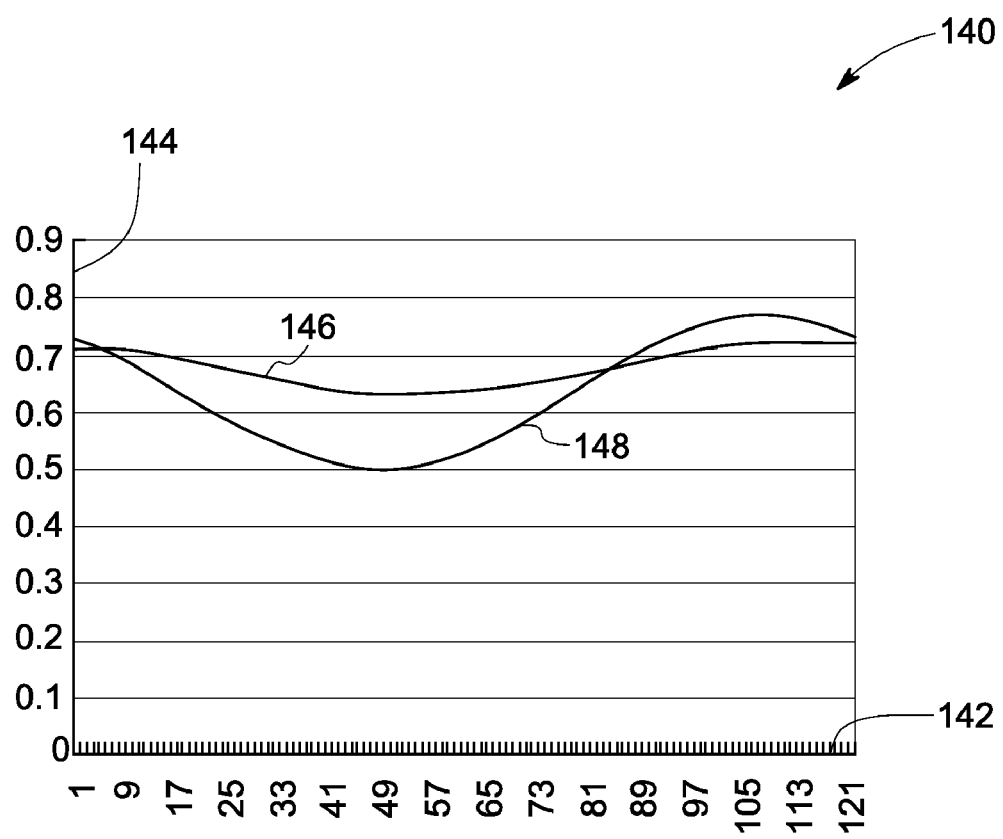
FIG. 7 is a graphical representation of exemplary results obtained from the calibration assembly of FIG. 6 in accordance with aspects of the present technique.

FIG. 7 is a graphical representation of exemplary results 140 obtained from the calibration assembly 120 of FIG. 6 in accordance with aspects of the present technique. In this exemplary embodiment, the abscissa axis represents a rotation angle 142 of the test part 124 and the ordinate axis represents a run-out measurement 144 from the run-out measurement device 128. The run-out measurements corresponding to different rotation angles at a first location of the run-out measurement device 128 are represented by exemplary profile 146. Further, the run-out measurements corresponding to different rotation angles at a second location of the run-out measurement device 128 are represented by exemplary profile 148. In this exemplary embodiment the first and second locations of the run-out measurement device are at a height of about 0.5 inches and 3.5 inches respectively from the base of the test part 124. The run-out measurements 146 and 148 are further utilized to estimate the calibration parameters for the inspection system 22.

Figure 8:
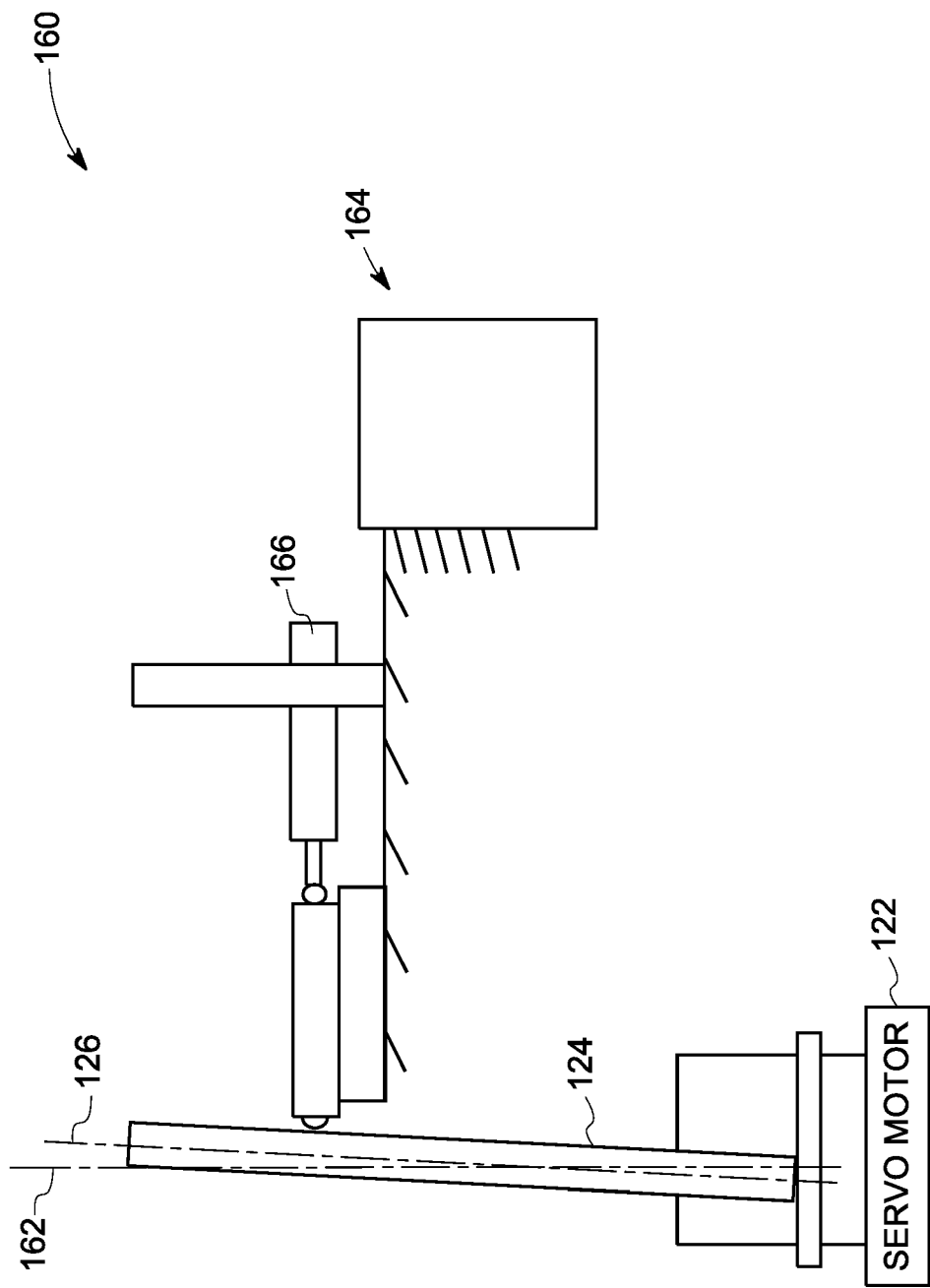
FIG. 8 is a diagrammatical illustration of another exemplary configuration of the calibration assembly employed in the system of FIG. 2 in accordance with aspects of the present technique.

FIG. 8 is a diagrammatical illustration of another exemplary configuration 160 of the calibration assembly 28 employed in the system of FIG. 2 in accordance with aspects of the present technique. In this exemplary embodiment, the calibration assembly 160 is configured to calibrate the inspection system 22 for reducing an alignment error of the rotary axis 126 of the cutting tool 24 (see FIG. 2) with respect to a z-axis 162. As illustrated, the calibration assembly 160 includes the servo motor 122 configured to rotate the test part 124. The calibration assembly 160 also includes a displacement measurement device such as micron indicator 166 configures to measure first and second displacements corresponding to the test part at first and second positions of the displacement measurement device 166. The calibration assembly 160 includes a slider 164 configured to move the displacement measurement device 166 along the z-axis 162. Further, the processor 32 is configured to estimate the calibration parameters for the inspection system 22 using the first and second displacement measurements. In one exemplary embodiment, the processor 32 is configured to estimate an angle between the rotary and x-axes of the cutting tool 26.

Figure 9:
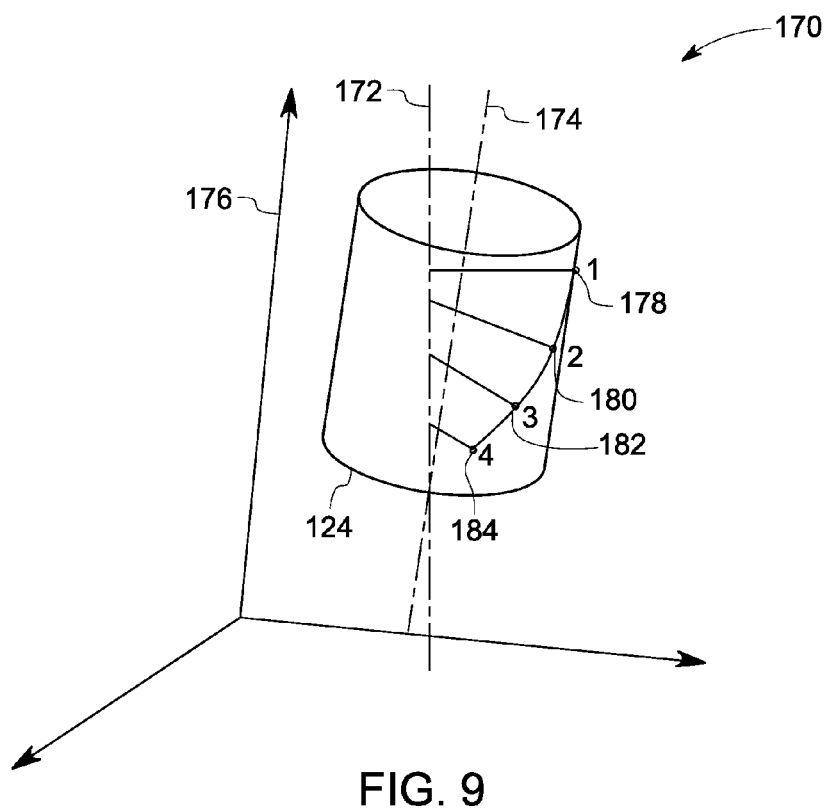
FIG. 9 is a diagrammatical illustration of an exemplary configuration of the calibration assembly of FIG. 8 in accordance with aspects of the present technique.

In operation, the test part 124 is rotated at a first angle so that the test part 124 contacts the displacement measurement device 166 through at least one contact point as shown in FIG. 9. FIG. 9 is a diagrammatical illustration of an exemplary configuration 170 of the calibration assembly 160 of FIG. 8. In this exemplary embodiment, the rotary and chuck axes are represented by reference numerals 172 and 174. Further, the z-axis is represented by reference numeral 176. The test part 124 is rotated at a pre-determined angle of rotation to contact the run-out measurement device 166 (see FIG. 8) at a first point 178. Further, the run-out measurement device 166 and the test part 124 are moved simultaneously to a second location such that points represented by reference numerals 180, 182 and 184 contact the displacement measurement device 166. In this exemplary embodiment, the displacement measurements are obtained at each of these contact points 178, 180, 182 and 184. Such measurements are utilized to estimate the calibration parameters for the inspection system 22 (see FIG. 2). In this exemplary embodiment, the rotary angle at points 178 and 184 represent angles $\alpha_1$, and $\alpha_2$ of the error model 50 of FIG. 3. Further, measurements corresponding to contact points 180 and 182 represent interpolation points between the contact points 178 and 184. The data corresponding to these points is plotted and a curve (not shown) may be fitted through these points 178, 180, 182 and 184. Further, a slope (slope 1) of such curve is determined.

Figure 10:
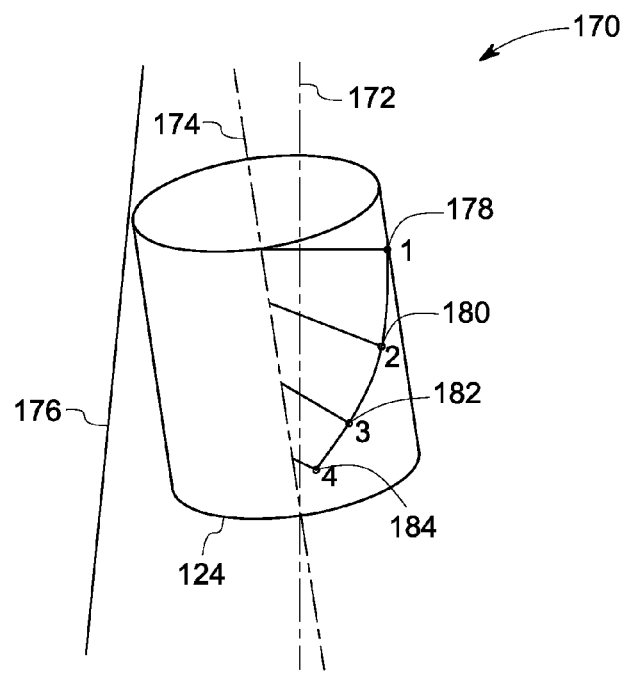
FIG. 10 is a diagrammatical illustration of another exemplary configuration of the calibration assembly of FIG. 8 in accordance with aspects of the present technique.

The test part is then rotated at about 180 degrees to set up a configuration 190 as illustrated in FIG. 10. Further, the steps of rotating the test part 124 at the predetermined angle of rotation to contact the displacement measurement device 166 at the first point 178 and simultaneously moving the displacement measurement device 166 and the test part 124 such that the points 180, 182 and 184 contact the displacement measurement device 128 are repeated. Further, the displacement measurements are obtained at each of these contact points 178, 180, 182 and 184 and such measurements are utilized to estimate the calibration parameters for the inspection system 22. Again, the data corresponding to these points is plotted and a slope (slope 2) of a curve through these points is determined.

Figure 11:
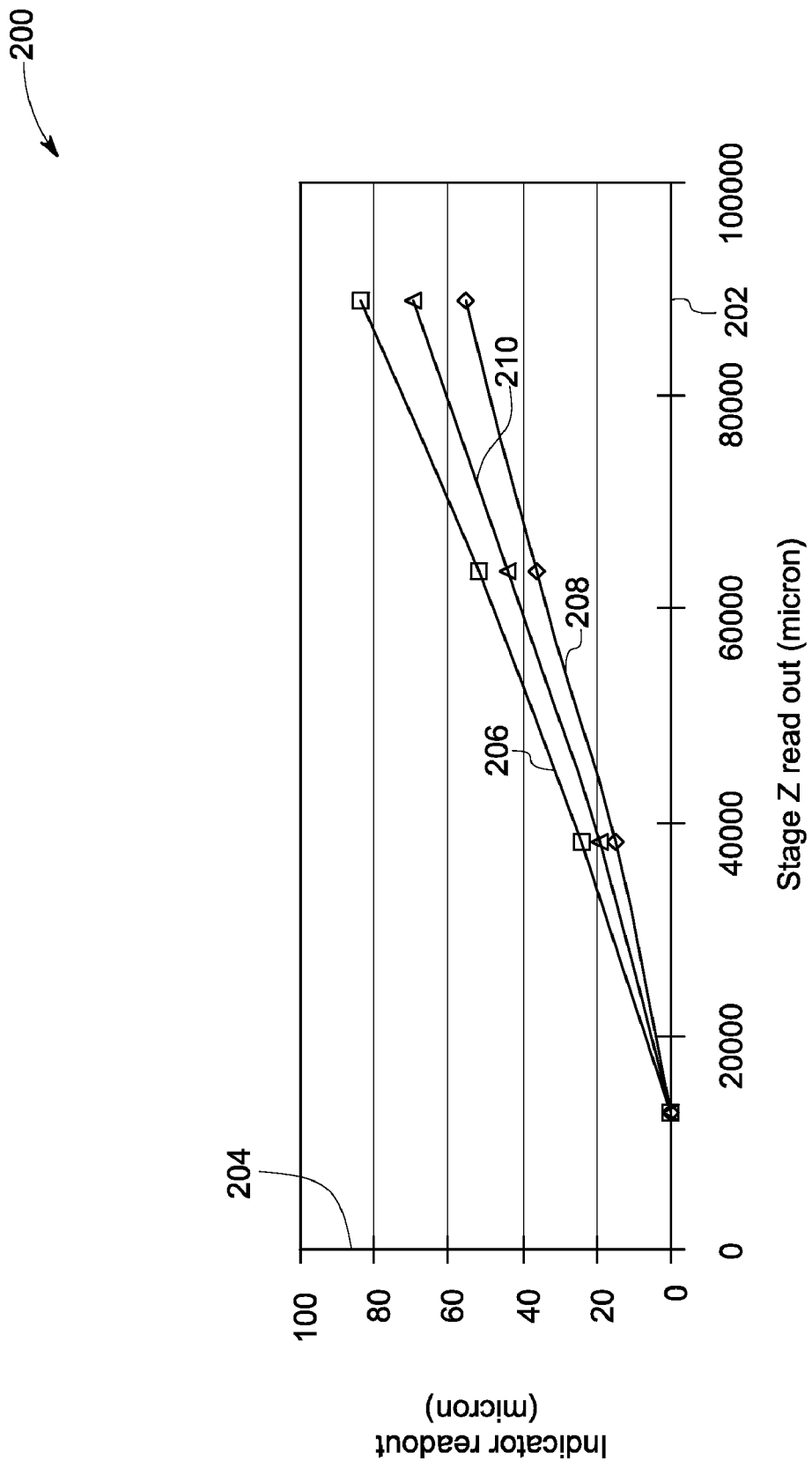
FIG. 11 is a graphical representation of exemplary measurement data obtained using the calibration assemblies of FIGS. 9 and 10.

FIG. 11 is a graphical representation of exemplary measurements 200 obtained from the calibration assemblies of FIGS. 9 and 10 in accordance with aspects of the present technique. The abscissa axis represents the measurement of the distance 202 moved by the test part 124 (see FIGS. 9 and 10) and the ordinate axis represents the measurement 204 obtained from the displacement measurement device 166 (see FIG. 8). In this exemplary embodiment, the curves fitted through points 178, 180, 182 and 184 at rotations of 0 degree and 180 degrees respectively are represented by reference numerals 206 and 208. Further, profile 210 represents curve having a slope that is average of slope 1 and slope 2 of curves 206 and 208 respectively. It should be noted that this average slope determines an angle between the axis of the test part and rotary axis in a XOZ plane.

The various aspects of the method described hereinabove have utility in parameter extraction of a variety of cutting tools such as ball end mills, flat end mills, drills, and reamers. As described above, the present technique employs a calibration technique to account for alignment errors due to orientation of axes of the cutting tool and a test part for providing an accurate estimation of the parameters. Advantageously, the technique enables consistent measurement of all cutting tool dimensions for a variety of cutting tools.

As will be appreciated by those of ordinary skill in the art, the foregoing example, demonstrations, and process steps may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, such as C++ or JAVA. Such code, as will be appreciated by those of ordinary skill in the art, may be stored or adapted for storage on one or more tangible, machine readable media, such as on memory chips, local or remote hard disks, optical disks (that is, CD's or DVD's), or other media, which may be accessed by a processor-based system to execute the stored code. Note that the tangible media may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of calibrating an inspection system, comprising:
    contacting a test part with a run-out measurement device;
    measuring a first run-out using the run-out measurement device while the test part is rotating;
    moving the run-out measurement device to a new position;
    repeating the steps of contacting and rotating the test part to measure a second run-out at the new position; and
    using the first and second run-outs to adjust measurements of the inspection system.

2. The method of claim 1, further comprising estimating calibration parameters from the first and second run-outs measured using the run-out measurement device.

3. The method of claim 2, wherein the calibration parameters are configured to substantially reduce an alignment error of rotary and chuck axes of a cutting tool.

4. The method of claim 3, wherein the calibration parameters comprise a distance between points of intersection of at least two section planes with the rotary and chuck axes of the cutting tool, an angle between line joining the points of intersection of the at least two section planes and an x-axis, or combinations thereof.

5. The method of claim 4, further comprising utilizing the calibration parameters to obtain parameters associated with the inspection system.

6. The method of claim 1, wherein the rotating step comprises rotating the test part at pre-determined rotating steps and measuring the run-out corresponding to each of the pre-determined rotating steps.

7. The method of claim 6, wherein the pre-determined rotating step comprises a rotation angle of less than about 1 degree.

8. The method of claim 7, wherein the pre-determined rotating step comprises a rotation angle of about 0.5 degrees.

9. A method of calibrating an inspection system, comprising:
    rotating a test part to contact a displacement measurement device;
    simultaneously rotating the test part and moving the displacement measurement device to a new position;
    measuring a first displacement at the new position using the displacement measurement device;
    rotating the test part at a pre-determined rotation angle;
    repeating the steps of rotating the test part to contact the displacement measurement device and simultaneously rotating the test part and moving the displacement measurement device to measure a second displacement; and
    using the first and second displacements to adjust measurements of the inspection system.

10. The method of claim 9, wherein simultaneously rotating the test part and moving the displacement measurement device comprises contacting the test part with the displacement measurement device at a plurality of locations.

11. The method of claim 10, further comprising measuring the first and second displacements at the plurality of locations using the displacement measurement device.

12. The method of claim 11, further comprising:
estimating calibration parameters from the first and second displacements measured from the displacement measurement device, wherein the calibration parameters are configured to reduce an alignment error of a rotary axis of a cutting tool with respect to a z-axis of the test part; and
utilizing the calibration parameters to obtain parameters associated with the inspection system.

13. A calibration assembly for an inspection system, comprising:
a servo motor configured to rotate a test part about a rotary axis at pre-determined rotating steps;
a run-out measurement device configured to measure first and second run-outs while the test part is rotating at respective first and second positions of the run-out measurement device; and
a processor configured to estimate calibration parameters from the first and second run-outs measured by the run-out measurement device.

14. The calibration assembly of claim 13, further comprising an optical encoder coupled to the servo motor for rotating the test part at the pre-determined rotating steps.

15. The calibration assembly of claim 13, wherein each of the pre-determined rotating steps comprises rotating the test part at a rotation angle of about less than 1 degree.

16. The calibration assembly of claim 13, wherein the run-out measurement device comprises a laser interferometer.

17. The calibration assembly of claim 13, wherein the inspection system comprises an inspection system for inspecting a cutting tool.

18. The calibration assembly of claim 17, wherein the calibration parameters are configured to substantially reduce an alignment error of rotary and chuck axes of the cutting tool.

19. The calibration assembly of claim 18, wherein the processor is configured to:
estimate parameters associated with the inspection system using the calibration parameters; and
correct measurements from the cutting tool using the calibration parameters.

20. A calibration assembly for an inspection system, comprising:
a servo motor configured to rotate a test part about a rotary axis at pre-determined rotating steps;
a displacement measurement device configured to measure first and second displacements while the test part is rotating at respective first and second positions of the displacement measurement device;
a slider configured to move the displacement measurement device along a z-axis; and
a processor configured to estimate calibration parameters from the first and second displacements measured using the displacement measurement device.

21. The calibration assembly of claim 20, further comprising an optical encoder coupled to the servo motor for rotating the test part at the pre-determined rotating steps.

22. The calibration assembly of claim 20, wherein the displacement measurement device comprises a micron indicator.

23. The calibration assembly of claim 20, wherein the calibration parameters are configured to substantially reduce an alignment error of a rotary axis of a cutting tool with respect to a z-axis of the test part.

24. The calibration assembly of claim 20, wherein the displacement measurement device is configured to measure the first and second displacements corresponding to a plurality of locations of the test part.

25. The calibration assembly of claim 24, wherein the processor is configured to estimate an angle between the rotary and x axes of the cutting tool.

* * * * *